(12) United States Patent
Srinivasan et al.

(10) Patent No.: US 8,146,041 B1
(45) Date of Patent: Mar. 27, 2012

(54) LATCH BASED OPTIMIZATION DURING IMPLEMENTATION OF CIRCUIT DESIGNS FOR PROGRAMMABLE LOGIC DEVICES

(75) Inventors: Sankaranarayanan Srinivasan, San Jose, CA (US); Sridhar Krishnamurthy, San Jose, CA (US); Brian D. Philofsky, Longmont, CO (US); Kamal Chaudhary, Saratoga, CA (US); Anirban Rahut, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 13/180,782

(22) Filed: Jul. 12, 2011

Related U.S. Application Data

(62) Division of application No. 12/128,335, filed on May 28, 2008, now Pat. No. 8,010,923.

(51) Int. Cl.
G06F 17/50 (2006.01)

(52) U.S. Cl. ........ 716/116; 716/100; 716/113; 716/117; 716/119; 716/122; 716/136; 716/137; 703/13; 703/14

(58) Field of Classification Search ................ 716/100, 716/113, 116, 117, 119, 122, 136, 137; 703/13, 703/14
See application file for complete search history.

(56) References Cited

U.S. PATENT DOCUMENTS

| | | | |
|---|---|---|---|
| 5,397,749 A | 3/1995 | Igarashi | |
| 6,178,539 B1 | 1/2001 | Papadopoulou et al. | |
| 6,543,032 B1 | 4/2003 | Zolotykh et al. | |
| 6,556,043 B2 | 4/2003 | Garcia | |
| 6,651,225 B1 * | 11/2003 | Lin et al. | 716/113 |
| 7,100,141 B1 * | 8/2006 | Ratchev et al. | 716/117 |
| 7,116,131 B1 | 10/2006 | Chirania et al. | |
| 7,117,143 B2 | 10/2006 | Wang et al. | |
| 7,219,048 B1 | 5/2007 | Xu | |
| 7,346,861 B1 | 3/2008 | Lee | |
| 7,356,454 B2 * | 4/2008 | Sakane et al. | 703/23 |
| 7,418,690 B1 * | 8/2008 | Van Antwerpen | 716/116 |
| 7,428,718 B1 | 9/2008 | Singh et al. | |
| 7,480,606 B2 * | 1/2009 | Tseng et al. | 703/14 |
| 7,536,661 B1 | 5/2009 | Singh et al. | |
| 7,657,855 B1 | 2/2010 | Manaker, Jr. et al. | |
| 7,814,452 B1 * | 10/2010 | Jang et al. | 716/100 |
| 7,870,530 B2 * | 1/2011 | Rohe et al. | 716/137 |
| 7,913,217 B1 * | 3/2011 | Carreira et al. | 716/119 |
| 7,979,831 B1 * | 7/2011 | Srinivasan | 716/122 |
| 2006/0190224 A1 | 8/2006 | Allen et al. | |
| 2009/0106719 A1 | 4/2009 | Stevens | |
| 2009/0327987 A1 * | 12/2009 | Teig et al. | 716/10 |

OTHER PUBLICATIONS

U.S. Appl. No. 12/128,335, filed May 28, 2008, Srinivasan et al.

(Continued)

*Primary Examiner* — Helen Rossoshek
(74) *Attorney, Agent, or Firm* — Kevin T. Cuenot; Lois D. Cartier

(57) ABSTRACT

A computer-implemented method of implementing a circuit design within a programmable logic device can include selecting at least one circuit element of the circuit design. The selected circuit element can be converted to a latch. A timing analysis can be performed upon the circuit design after conversion of the selected circuit element to a latch. A determination can be made by a computer as to whether the timing of the circuit design improves and the conversion of the selected circuit element to a latch can be accepted when the timing of the circuit design improves. The circuit design can be output.

10 Claims, 3 Drawing Sheets

OTHER PUBLICATIONS

Burks, Timothy M. et al., "Critical Paths in Circuits with Level-Sensitive Latches," *IEEE Transactions on Very Large Scale Integration (VLSI) Systems*, Jun. 1995, pp. 273-291, vol. 3, No. 2, IEEE, Piscataway, New Jersey, USA.

Hitchcock, R,. "Timing Verification and the Timing Analysis Program," *Proceedings of the 19th Design Automation Conference*, Jun. 14, 1982, pp. 446-456.

Kourtev, Ivan S. et al., "Clock Skew Scheduling for Improved Reliability via Quadratic Programming," *Proc. of the 1999 Int'l. Conference on Computer-Aided Design (ICCAD'99)* Nov. 7, 1999, pp. 239-243.

Lalgudi, Kumar N. et al., "Fixed-Phase Retiming for Low Power Design," *Proc. of the International Symposium on Low Power Electronics and Design*, Aug. 12, 1996, pp. 259-264.

Nakamura, Yuichi, "A Design Method for Skew Tolerant Latch Design," *Proc. of the 2008 IEEE Asia Pacific Conference on Circuits and Systems*, Nov. 30, 2008, pp. 356-359, IEEE, Piscataway, New Jersey, USA.

Taskin, Baris et al., "Linearization of the Timing Analysis and Optimization of Level-Sensitive Digital Synchronous Circuits," *IEEE Transactions on Very Large Scale Integration (VLSI) Systems*, Jan. 2004, pp. 12-27, vol. 12, No. 1, IEEE, Piscataway, New Jersey, USA.

Taskin, Baris et al., "Time Borrowing and Clock Skew Scheduling Effects on Multi-Phase Level-Sensitive Circuits," *Proc. of the 2004 International Symposium on Circuits and Systems (ISCAS'04)* May 23, 2004, pp. II-617-II-620, vol. 2.

Wu, Tsung-Yi et al., "Storage Optimization by Replacing Some Flip-Flops with Latches," *Proc. of the 1996 EURO-DAC European Design Automation Conference, with EURO-VHDL '96 and Exhibition*, Sep. 16, 1996, pp. 296-301, IEEE, Piscataway, New Jersey, USA.

Yoshikawa, Ko et al., "Timing Optimization by Replacing Flip-Flops to Latches," *Proc. of the ASP-DAC 2004 Asia and South Pacific Design Automation Conference*, Jan. 27, 2004, pp. 186-191, IEEE, Piscataway, New Jersey, USA.

* cited by examiner

LATCH BASED OPTIMIZATION DURING IMPLEMENTATION OF CIRCUIT DESIGNS FOR PROGRAMMABLE LOGIC DEVICES

FIELD OF THE INVENTION

The embodiments disclosed herein relate to integrated circuit devices (ICs). More particularly, the embodiments relate to optimizing circuit designs for implementation within a programmable logic device type of IC.

BACKGROUND

Programmable logic devices (PLDs) are a well-known type of IC that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

Generally, circuit designs for PLDs are implemented through a process referred to as an implementation flow that is performed by one or more computer-based electronic design automation (EDA) tools. An implementation flow entails the various processes that are applied to a programmatic representation of a circuit design, e.g., a hardware description language (HDL) description of a circuit, a netlist, or the like, in order to implement that circuit design within a specific target PLD. For example, an implementation flow typically includes processes such as synthesis, mapping, placing, and routing.

The resulting circuit design can be converted to a stream of configuration data. Generally, the programmable interconnect and programmable logic of a PLD are programmed by loading the stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Other types of PLDs can include Complex Programmable Logic Devices (CPLDs), Programmable Logic Arrays (PLAs), Programmable Array Logic (PAL) devices, or the like. For all of these PLDs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Still other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" can include but, are not limited to, these exemplary devices, and further can encompass devices that are only partially programmable. For example, one type of PLD includes a combination of hard-coded transistor logic and a programmable switch fabric that programmably interconnects the hard-coded transistor logic.

In some cases, it becomes necessary to modify a circuit design in order to achieve a design goal. Typically design goals are specified in terms of constraints to which the circuit, or some portion of the circuit, must conform. Constraints can be specified in terms of timing, power consumption, area consumption, or the like. When a circuit design does not meet one or more established constraints, it becomes necessary to modify the circuit design in some way during the implementation flow in order to achieve stated design goals.

SUMMARY

The embodiments disclosed herein relate to optimizing a circuit design for implementation within a programmable logic device (PLD). One embodiment of the present invention can include a computer-implemented method of implementing a circuit design within a PLD. The computer-implemented method can include selecting at least one circuit element of the circuit design, converting the selected circuit element to a latch. A timing analysis can be performed upon the circuit design after conversion of the selected circuit element to a latch and a determination can be made as to whether the timing of the circuit design improves. The conversion of the selected circuit element to a latch can be accepted when the timing of the circuit design improves. The circuit design can be output.

Selecting at least one circuit element can include selecting at least one combinatorial logic circuit element, selecting at least one flip-flop, and/or selecting at least one combinatorial logic circuit element and at least one flip-flop.

The computer-implemented method can include identifying a portion of the circuit design from which the selected circuit element is chosen. In another aspect, the computer-implemented method can include identifying a path of the circuit design that does not meet a timing constraint, identifying circuit elements on the identified path, and choosing a circuit element from the circuit elements on the identified path as the selected circuit element.

The computer-implemented method also can include iteratively performing timing analysis upon the circuit design and converting at least one circuit element of the circuit design into a latch until an exit criterion is reached or a timing constraint is met. The conversion of the selected circuit element to a latch can be rejected when the timing of the circuit design does not improve.

Another embodiment of the present invention can include a computer-implemented method of implementing a circuit design within a PLD including converting at least one circuit element of the circuit design to a latch, determining whether a result of a cost function for the circuit design is reduced in consequence of converting the at least one circuit element of the circuit design to a latch, and accepting conversion of the at least one circuit element to a latch when the result of the cost function is reduced. The circuit design can be output.

Determining whether a result of the cost function of the circuit design is reduced can include determining whether usage area of at least a portion of the circuit design including the circuit element is reduced by converting the circuit element to a latch, determining whether a number of look-up tables of the circuit design is reduced by converting the circuit element to a latch, and/or determining whether power consumption of at least a portion of the circuit design including the selected circuit element is reduced by converting the circuit element to a latch.

The computer-implemented method also can include selecting the circuit element to include at least one combinatorial logic circuit element and/or selecting the circuit element to include at least one flip-flop.

Yet another embodiment of the present invention can include a computer program product including a computer-usable medium having computer-usable program code that, when executed by a data processing system, causes the data processing system to perform the various steps and/or functions disclosed herein.

DETAILED DESCRIPTION

Figure 1:
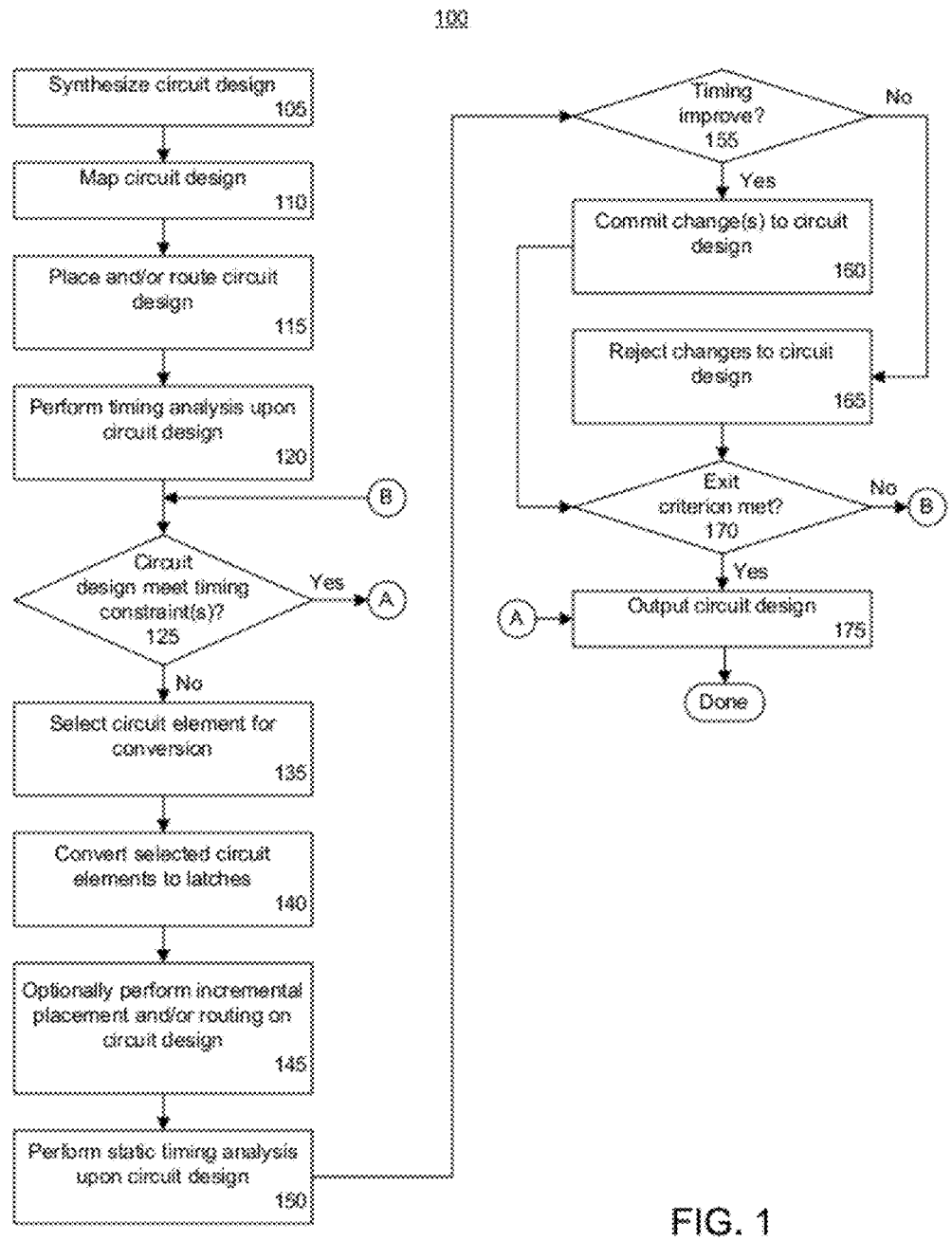
FIG. 1 is a flow chart illustrating a method of implementing a circuit design within a programmable logic device (PLD) in accordance with one embodiment of the present invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The embodiments disclosed herein relate to optimizing circuit designs for implementation in an integrated circuit (IC). One embodiment is well suited to implementing circuit configuration within a programmable logic device (PLD). More particularly, the embodiments relate to the usage of latch circuit elements as replacements for other circuit elements within a circuit design. In some cases, for example, flip-flops can be replaced with latches to improve the timing of a circuit design. In other cases, selected circuit elements can be replaced with latches to reduce area consumption, power consumption, and/or the number of look-up tables (LUTs) utilized by the circuit design.

It is noted here that embodiments of the present invention may be used to implement many types of circuits, whether in fabricated semiconductor hardware or in the configured circuitry applied to the re-configurable fabric of a programmable logic device such as a Field Programmable Gate Array. In this description of various embodiments, programmable Logic devices (PLDs), field programmable gate arrays (FPGAs) and other such specific references are used to illustrate applications and implementations of the embodiments described. It must be remembered that many embodiments are applicable to other types of integrated circuit implementation.

As used herein, the term "latch" can refer to a level sensitive latch. A level sensitive latch effectively takes an input and latches an output when a change in the input is detected during a high or a low clock signal, depending upon the latch configuration. Thus, if a latch is configured to operate on a high clock signal, the output of the latch can reflect the input at any time during the high portion of the clock signal. If configured to operate on the low portion of the clock signal, the output of the latch can reflect the input at any time during the low portion of the clock signal.

A flip-flop, by comparison, can change output when the clock is high and only at edges of the clock signal. Consider edge-triggered flip-flops. A positive edge triggered flip-flop may change output only at a rising clock edge. A negative edge-triggered flip-flop may change output only at a falling clock edge. Thus, whereas a latch can change output at any time during a high clock signal or a low clock signal, depending upon the particular latch configuration, the flip-flop output only reflects the flip-flop input, e.g., can change, responsive to a rising or a falling clock edge, but not in-between the rising and falling clock edges.

FIG. 1 is a flow chart illustrating a method 100 of implementing a circuit design within a PLD in accordance with one embodiment of the present invention. The method 100 can be implemented using one or more computer-based electronic design automation (EDA) tools capable of performing one or more tasks of an implementation flow. The method 100 illustrates an embodiment in which latches are used to optimize a circuit design to improve timing.

The method 100 can begin in step 105 where a circuit design, e.g., a programmatic description of a circuit, is synthesized. As used herein, "synthesizing" a circuit design generally refers to the process of converting a programmatic description of a circuit, for example, a hardware description language (HDL) description of a circuit, into a gate level description of the circuit. In this sense, the circuit design is "compiled" into an implementation of low level logic gates using a logic synthesis tool.

In step 110, the circuit design can be mapped. As used herein, "mapping" a circuit design generally refers to the process of identifying constructs of the logical netlist, e.g., primitive logic gates, and associating those logic primitives with the actual physical resources of the target device that will implement the logic primitives. For example, one or more individual logic gates may be mapped to a single LUT, a latch, one or more flip-flops, block random access memories (BRAMs), or the like.

In step 115, the circuit design can be placed and/or routed. As used herein, "placing" a circuit design generally refers to the process of assigning the physical resources, to which logic primitives of the synthesized circuit design have been mapped, to actual locations of the target device. For example, once logic gates are assigned to LUTs for implementation, a particular location of the LUT on the target device can be determined. More particularly, with respect to an FPGA type of PLD, a particular LUT, having a location, is selected to implement the logic primitives. As used herein, "routing" a circuit design refers to the process of programming the interconnect circuitry to establish the necessary signaling links among the various physical resources of the target device.

It should be appreciated that the embodiments disclosed herein can be performed before placement, after placement and before routing, or after routing. If implemented prior to routing, generalized delay information can be determined upon which the circuit design can be evaluated. When performed after placement and before routing, such information can be based upon the locations of the circuit elements on the target device, but not upon actual signal paths, e.g., routing information. If implemented after routing, accurate delay information can be determined as physical signal paths will be known prior to performing any timing analysis. In any case, the embodiments disclosed herein are not intended to be limited to implementation at one particular location within an implementation flow.

In step 120, a timing analysis can be performed upon the circuit design. More particularly, a static timing analysis can be performed. Static timing analysis can evaluate all possible paths of a digital circuit and indicate a worst case scenario in terms of the delay information that is created on a per signal path basis. As such, static timing analysis reflects the delay variations that may occur during normal operation of a digital circuit. Examples of these variations can include, but are not limited to, clock skew, clock uncertainty, or the like. In general, static timing analysis involves both setup checks and hold checks.

In step 125, a determination can be made as to whether the circuit design meets established timing constraints. If so, the method can proceed to step 175, where the circuit can be output and the method can end. As used herein, "outputting" and/or "output" can mean, for example, writing to a file, writing to a user display or other output device, playing audible notifications, sending or transmitting to another system, exporting, or the like. If the circuit design does not meet established timing constraints, the method can proceed to step 135.

In step 135, where the circuit design does not meet timing constraints, a circuit element can be selected from the circuit design. In certain cases, circuit elements, such as flip-flops, can be converted to latches to improve timing of the circuit design. For instance, when a source flip-flop is converted to a latch, data can be immediately available at the output of the latch responsive to a changing input when the clock signal is high (or low as the case may be) rather than awaiting a clock signal edge to trigger an output in the case of a flip-flop. Thus, the signal path may become less critical. A signal can be output from the source latch earlier than would be the case for a source flip-flop, which would not output a signal until the appropriate clock edge is detected.

Converting a destination flip-flop to a latch can allow data to arrive later than would be the case for the destination flip-flop. A positive edge triggered flip-flop, for example, would latch data when the clock signal rises. Input to the flip-flop must arrive prior to the rising edge of the clock. In the case of a latch, data could arrive later than the rising edge of the clock signal, but still trigger the latch.

Consider another example where a signal path has a connectivity flowing from flip-flop A to flip-flop B to flip-flop C. The portion of the path B-C can be timing critical, e.g., require more time for a signal to propagate down the signal path than is allowed according to an applicable timing constraint for the signal path. The portion of the signal path A-B can be non-critical. If flip-flop B is converted into a latch, the signal path effectively becomes A-C, with latch B being transparent. The transformation of flip-flop B into a latch allows the critical portion of the path B-C to borrow excess slack from the non-critical portion of the path A-B. Other modifications of the circuit design also can be performed. For example, the phase of the clock on latch B can be shifted to allow some time to be borrowed to alleviate the critical slack. An incremental placer would account for this when replacing the components for A, B, and C.

In step 135, the circuit element can be selected using any of a variety of different selection techniques. In one embodiment, each flip-flop can be selected, one-by-one, from the circuit design. In another embodiment, the pool of circuit elements from which a circuit element can be selected first can be limited to those circuit elements that are members of a designated portion of a circuit design. For example, a signal path that does not conform to an established timing constraint, e.g., a timing critical path, can be selected as a portion of the circuit design. This portion, e.g., a nonconforming portion of the circuit design, can be automatically selected by the EDA tool. In still another embodiment, the circuit designer can manually specify the pool of circuit elements from which a selected flip-flop can be chosen.

In step 140, the selected circuit element can be converted to a latch. It should be appreciated that the conversion of a flip-flop to a latch, at least in some PLDs, e.g., FPGAs, may entail changing configuration data for a given logic block. Such a change in configuration data would alter the logic block from behaving like a clocked flip-flop to a level-sensitive latch.

In step 145, incremental placement and/or routing optionally can be performed upon the circuit design or a portion of the circuit design including the converted circuit element. Incremental placement or incremental routing refers to a methodology for processing circuit designs in a manner that attempts to reuse implementation data generated for unchanging portions of the circuit design. For example, if a portion of the circuit design is changed, e.g., flip-flops converted to latches, implementation data for unchanging portions of the circuit design can be reused when performing placement, routing, or both placement and routing on the changed circuit design.

In step 150, static timing analysis can be performed upon the circuit design. As noted, static timing analysis can provide accurate and detailed timing information for the circuit design. Static timing analysis will calculate any changes in timing introduced into the circuit design as a consequence of converting the circuit element to a latch. Static timing analysis can reflect changes with respect to both the signals input to the latch and the signals output from the latch. In this sense, static timing analysis reflects the role of the converted circuit element as both a source and a load.

In step 155, a determination can be made as to whether timing of the circuit design has improved in consequence of converting the circuit element to a latch. For example, a determination can be made as to whether the criticality of a timing critical path has been reduced by the conversion of a flip-flop to a latch. It should be appreciated that the critical path may still be critical. So long as the criticality is reduced, however, the timing can be said to have improved.

If the timing has improved, the method can continue to step 160. If not, the method can continue to step 165. In step 160, any changes to the circuit design in terms of conversion of flip-flops to latches and incremental placement and/or routing can be committed or stored. After step 160, the method can proceed to step 170. In step 165, any changes to the circuit design, e.g., conversion of flip-flops to latches and incremental placement and/or routing, can be rejected. That is, the circuit can be returned to its original configuration prior to performance of step 140 and/or 145 and the changes can be discarded.

Continuing with step 170, a determination can be made as to whether an exit criterion has been met. If an exit criterion has been met, the method can proceed to step 175. If no exit criterion has been met, the method can loop back to step 125 to continue processing the circuit design. One example of an exit criterion can include exiting the circuit optimization process when an iteration count is exhausted. A maximum number of iterations can be set. When the method 100 meets or exceeds the maximum number of iterations, the method can exit, e.g., proceed to step 175. Another example of an exit criterion can include exiting when no further circuit elements remain to be processed. For example, when no further flip-flops remain to be processed from the circuit design or when no further flip-flops from an enumerated pool of flip-flops remain to be processed, the method can exit.

Other examples of exit criteria can include exiting when the method appears to oscillate between improving and not improving from one iteration to the next and/or exiting when successive improvements in timing become smaller or do not exceed a threshold improvement level. For example, the method can exit when timing of a particular path does not improve by a minimum percentage or by a minimum amount of time. Still another example of an exit criterion can include exiting when the same critical path continues to emerge as a critical portion of the circuit design thereby indicating that the portion, or signal path, cannot be improved.

In step 175, the circuit design can be output.

Figure 2:
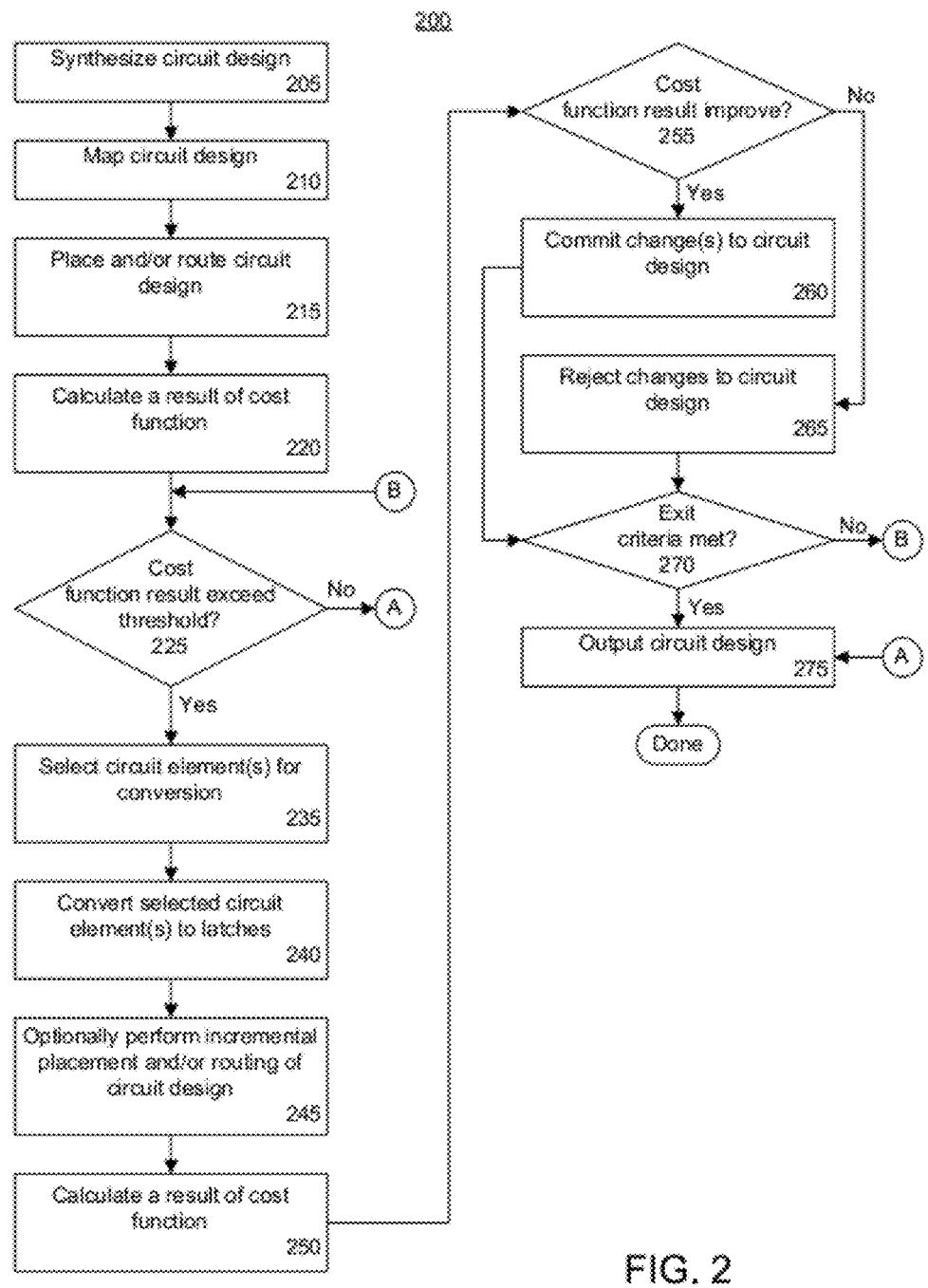
FIG. 2 is a second flow chart illustrating a method of implementing a circuit design within a PLD in accordance with another embodiment of the present invention.

FIG. 2 is a flow chart illustrating a method 200 of implementing a circuit design within a PLD in accordance with another embodiment of the present invention. As mentioned with respect to FIG. 1, the method 200 can be implemented using one or more EDA tools capable of performing one or more tasks of an implementation flow. The method 200 illustrates an embodiment in which latches are used to optimize a circuit design with respect to one or more design objectives including, for example, area consumption, power consumption, timing, and/or LUT usage.

The method 200 can begin in step 205 where a circuit design is synthesized. In step 210, the circuit design can be mapped. In step 215, the circuit design can be placed and/or routed. As noted, the embodiments disclosed herein can be performed before placement, after placement and before routing, or after routing.

In step 220, a result for a cost function can be calculated. In one embodiment, the cost function can depend upon a measure of area consumed by the circuit design, or any portion thereof, on the target device when the circuit design is implemented. For example, the cost function can be the area required to implement a region, module, or other portion of the circuit design. In another embodiment, the cost function can reflect the power consumed by the circuit design or a portion of the circuit design such as a region or a module. In still another embodiment, the cost function can be a look-up table (LUT) count, e.g., the number of LUTs utilized by the circuit design or a portion of the circuit design. In another embodiment, a cost function that is dependent upon timing criticality can be used. It should be appreciated that when calculating the cost function, any necessary analysis in terms of timing, power consumption, area usage, and/or LUT count may be performed.

The cost function provides a result that reflects a cost, in terms of the quantities involved in the cost function, of implementing the circuit design in a particular manner. Changing the implementation of the circuit design in a manner that reduces the result of the cost function indicates an improvement, e.g., reduced cost, in terms of one or more or all of the various objectives, or factors, considered by the cost function. Thus, in another embodiment, a cost function can depend upon a plurality of different objectives. Such a cost function can include, or depend upon, for example, a measure of area consumption, a measure of power consumption, a measure of LUT usage, a measure of timing, or any combination thereof.

The cost function can add the various measures, apply scaling factors, etc., to achieve a final cost function result or value.

In step 225, a determination can be made as to whether the value of the cost function exceeds an established threshold. If the value of the cost function does not exceed the threshold, the method can proceed to step 275, where the circuit design can be output and the method can end. If the value of the cost function does exceed the threshold, the method can continue to step 235.

In step 235, one or more circuit elements of the circuit design can be selected. In one embodiment, a portion of combinatorial logic that may include one or more circuit elements, e.g., logic gates, can be selected. In another embodiment, one or more flip-flops can be selected. As noted, circuit element(s) can be selected using any of a variety of different selection techniques. In one embodiment, for example, circuit elements can be selected from the entirety of the circuit design one-by-one, or one portion of combinatorial logic at a time. In another embodiment, the pool of available circuit elements from which a circuit element can be selected can be limited in some way.

For example, a portion of the circuit design can be identified automatically by the EDA tool as a portion that is a candidate for improvement in terms of timing, power consumption, area usage, flip-flop count, or any combination thereof. As noted, the cost function can be computed for the entirety of the circuit design as well as for individual portions of the circuit design. For example, the portion of the circuit design that is the largest contributor to the cost function with respect to the entire circuit design or that has the highest cost of any other portion of the circuit design can be identified. That portion of the circuit design will likely fail to meet one or more of the objectives reflected in the cost function, e.g., power consumption, timing, area usage, LUT count, or any combination thereof.

In another example, a list of portions of the circuit design can be presented from which circuit designer may manually select. In that case, the circuit designer can manually specify the pool of circuit elements from which a circuit element or elements will be selected.

In step 240, the selected circuit element(s) can be converted to a latch. In the case of combinatorial logic, one or more logic gates may be implemented by a single latch. It should be appreciated that converting selected logic gates to latch implementations can reduce area utilized by the circuit design as well as reduce power consumption.

In step 245, incremental placement and/or routing optionally can be performed upon the circuit design. In one embodiment, any portions of combinatorial logic converted to a latch can be moved or relocated closer to the source providing signal to that latch. That is, the latch that implements the converted combinatorial logic can be moved or relocated. In this manner, timing can be improved by converting combinatorial logic to latches and also by relocating the latches. In step 250, after conversion of the selected circuit elements to latches, the cost function can be calculated. As noted, when calculating the cost function, any necessary analysis in terms of timing, power consumption, area usage, and/or LUT count may be performed.

In step 255, a determination can be made as to whether the result of the cost function has improved in consequence of converting one or more circuit elements to latches. As noted, reduction in the result of the cost function can indicate a reduction in area usage, a reduction in power consumption, a reduction in LUT count, an improvement in timing, or an improvement in any combination of such metrics that may be included or used in the cost function. If the result of the cost function decreases, the method can continue to step 260, where the changes to the circuit design can be committed. If not, the method can continue to step 265, where the changes to the circuit design can be rejected.

In step 270, a determination can be made as to whether an exit criterion has been met. If an exit criterion has been met, the method can proceed to step 275. If no exit criterion has been met, the method can loop back to step 225 to continue processing the circuit design. In step 275, the circuit design can be output.

It should be appreciated that while method 100 of FIG. 1 and the method of FIG. 2 are illustrated independently, both can be performed with respect to a given circuit design. The circuit design can be optimized in terms of timing, power consumption, area usage, and/or LUT count individually in any order, or concurrently. Additionally, at times within this specification the conversion of circuit elements to latches is described in terms of converting a single circuit element to a latch during a given iteration. It should be appreciated that multiple circuit elements, including flip-flops, can be converted to latches during a single iteration.

Figure 3:
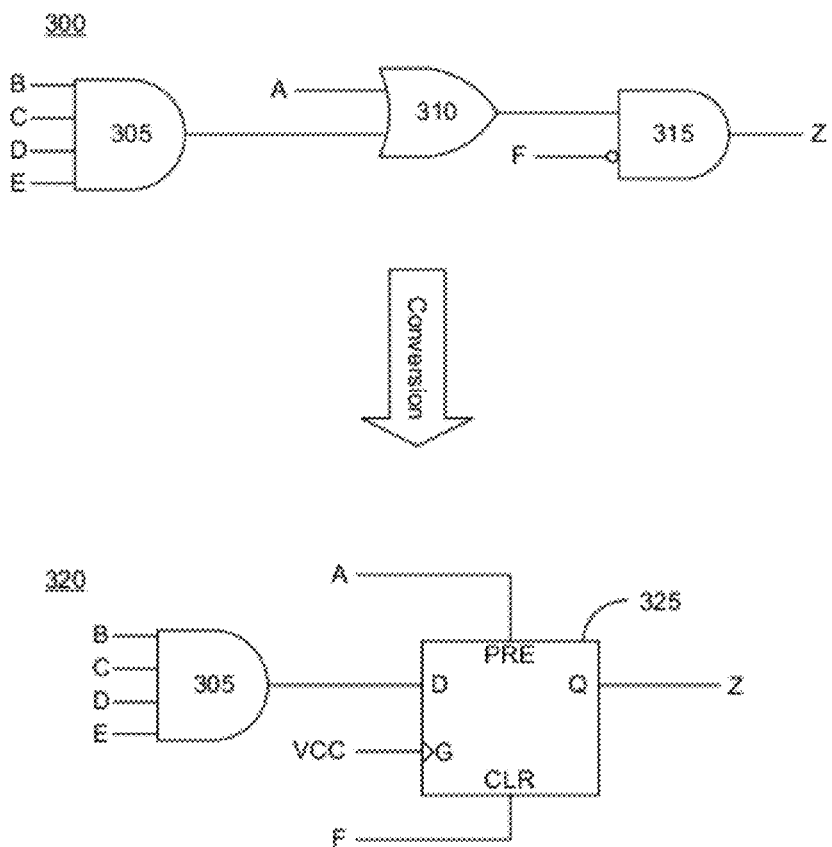
FIG. 3 is a series of block diagrams illustrating a technique for optimizing a circuit design in accordance with another embodiment of the present invention.

FIG. 3 is a series of block diagrams illustrating a technique for optimizing a circuit design in accordance with another embodiment of the present invention. As shown, a circuit 300 includes a logical AND gate 305 receiving three input signals B, C, D, and E. An output of the logical AND gate 305 drives an input of a logical OR gate 310. The logical OR gate 310 also receives another input signal A. The output of the logical OR gate 310 drives an input of a logical AND gate 315. The logical AND gate 315 also receives an input signal F at an inverting input as shown. The logical AND gate 315 outputs a signal Z.

Circuit 320 illustrates an exemplary implementation of circuit 300 after conversion of combinatorial logic elements to latches. Circuit 320 is functionally equivalent to circuit 300. As shown, logical OR gate 315 and logical AND gate 320 have been replaced with a latch 325. Replacement of the combinatorial logic with latch 325 can reduce the power consumption of the circuit as well as the area needed for implementation upon the target device.

The flowcharts in the figures illustrate the architecture, functionality, and operation of possible implementations of systems, methods and computer program products according to various embodiments of the present invention. In this regard, each block in the flowcharts may represent a module, segment, or portion of code, which comprises one or more portions of computer-usable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and computer instructions.

Embodiments of the present invention can be realized in hardware, software, or a combination of hardware and software. The embodiments can be realized in a centralized fashion in one data processing system or in a distributed fashion where different elements are spread across several interconnected data processing systems. Any kind of data processing system or other apparatus adapted for carrying out the methods described herein is suited. A typical combination of hardware and software can be a general-purpose computer system with a computer program that, when being loaded and executed, controls the computer system such that it carries out the methods described herein.

A data processing system, e.g., a computer or computer system, suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

Embodiments of the present invention further can be embedded in a computer program product, which comprises all the features enabling the implementation of the methods described herein. The computer program product can include a computer-usable or computer-readable medium having computer-usable program code which, when loaded in a computer system, causes the computer system to perform the functions described herein. Examples of computer-usable or computer-readable media can include, but are not limited to, optical media, magnetic media, computer memory, one or more portions of a wired or wireless network through which computer-usable program code can be propagated, or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A computer-implemented method of implementing a circuit design within an integrated circuit, the method comprising:
    converting at least one circuit element of the circuit design to a latch;
    determining, by a computer, whether a result of a cost function of the circuit design is reduced in consequence of converting the at least one circuit element of the circuit design to a latch;
    wherein determining whether the result of the cost function is reduced comprises determining whether a number of look-up tables of the circuit design is reduced by converting the circuit element to a latch;
    accepting conversion of the at least one circuit element to a latch when the result of the cost function is reduced; and
    outputting the circuit design by the computer.

2. The computer-implemented method of claim 1, wherein determining whether the result of the cost function is reduced comprises determining whether usage area of at least a portion of the circuit design comprising the circuit element is reduced by converting the circuit element to a latch.

3. The computer-implemented method of claim 1, wherein determining whether the result of the cost function is reduced comprises determining whether power consumption of at least a portion of the circuit design comprising the selected circuit element is reduced by converting the circuit element to a latch.

4. The computer-implemented method of claim 1, further comprising selecting the circuit element to comprise at least one combinatorial logic circuit element.

5. The computer-implemented method of claim 1, further comprising selecting the circuit element to comprise at least one flip-flop.

6. An apparatus, comprising:
    a non-transitory computer-usable medium having instructions written thereon for implementing a method of implementing a circuit design within an integrated circuit, the method comprising:
    converting at least one circuit element of the circuit design to a latch;
    determining, by a computer, whether a result of a cost function of the circuit design is reduced in consequence of converting the at least one circuit element of the circuit design to a latch;
    wherein determining whether the result of the cost function is reduced comprises determining whether a number of look-up tables of the circuit design is reduced by converting the circuit element to a latch;
    accepting conversion of the at least one circuit element to a latch when the result of the cost function is reduced; and
    outputting the circuit design.

7. The apparatus of claim 6, wherein determining whether the result of the cost function is reduced comprises determining whether usage area of at least a portion of the circuit design comprising the circuit element is reduced by converting the circuit element to a latch.

8. The apparatus of claim 6, wherein determining whether the result of the cost function is reduced comprises determining whether power consumption of at least a portion of the circuit design comprising the selected circuit element is reduced by converting the circuit element to a latch.

9. The apparatus of claim 6, wherein the method further comprises selecting the circuit element to comprise at least one combinatorial logic circuit element.

10. The apparatus of claim 6, wherein the method further comprises selecting the circuit element to comprise at least one flip-flop.

\* \* \* \* \*